(12) United States Patent
Kaneda et al.

(10) Patent No.: US 7,716,496 B2
(45) Date of Patent: May 11, 2010

(54) ENCRYPTION/DECRYPTION MANAGEMENT METHOD IN COMPUTER SYSTEM HAVING STORAGE HIERARCHY

(75) Inventors: Yasunori Kaneda, Sagamihara (JP); Yuichi Taguchi, Sagamihara (JP); Fumi Miyazaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1157 days.

(21) Appl. No.: 10/988,538

(22) Filed: Nov. 16, 2004

(65) Prior Publication Data

US 2006/0062383 A1 Mar. 23, 2006

(30) Foreign Application Priority Data

Sep. 21, 2004 (JP) .............................. 2004-272772

(51) Int. Cl.
| | | |
|---|---|---|
| G06F 7/04 | (2006.01) | |
| G06F 17/30 | (2006.01) | |
| G06F 13/00 | (2006.01) | |
| G06F 13/28 | (2006.01) | |
| H04L 9/32 | (2006.01) | |
| H04N 7/16 | (2006.01) | |
| B41K 3/38 | (2006.01) | |

(52) U.S. Cl. .............................. 713/193; 726/2; 726/26; 711/163; 380/59

(58) Field of Classification Search ........................ None
See application file for complete search history.

(56) References Cited

U.S. PATENT DOCUMENTS

| | | | |
|---|---|---|---|
| 6,263,445 B1 * | 7/2001 | Blumenau | 726/2 |
| 6,678,828 B1 * | 1/2004 | Zhang et al. | 726/2 |
| 6,971,016 B1 * | 11/2005 | Barnett | 713/182 |
| 7,140,044 B2 * | 11/2006 | Redlich et al. | 726/27 |
| 7,240,197 B1 * | 7/2007 | Yamagami et al. | 713/168 |
| 2002/0091828 A1 | 7/2002 | Kitamura et al. | |
| 2003/0177422 A1 * | 9/2003 | Tararoukhine et al. | 714/48 |

FOREIGN PATENT DOCUMENTS

| | | |
|---|---|---|
| JP | 2001-142648 | 5/2001 |
| JP | 2002-351747 | 12/2002 |

* cited by examiner

*Primary Examiner*—Eleni A Shiferaw
*Assistant Examiner*—Oscar A Louie
(74) *Attorney, Agent, or Firm*—Antonelli, Terry, Stout & Kraus, LLP.

(57) ABSTRACT

When a computer system including a data storage apparatus having a data storage area storing encrypted data is modified to have plural encryption/decryption units, a computer cannot appropriately use the encrypted data storage area if a path including the encryption/decryption means is not adequately determined.

In a computer system having a computer 10, two or more data storage apparatuses 100 and 200 arranged hierarchically, plural encryption/decryption modules 199 and 299 on a path between the computer 10 and a data storage area 101, and a management computer 500 for managing the data storage apparatuses and the like, if there is an interoperability between the encryption/decryption modules 199 and 299 and the data storage area 101 is encrypted by the first encryption/decryption module 199, the computer 10 accesses the data storage area 101 using the second encryption/decryption module 299 (or an n-th encryption/decryption module closer to the computer than the second encryption/decryption module), rather than the first encryption/decryption module.

10 Claims, 12 Drawing Sheets

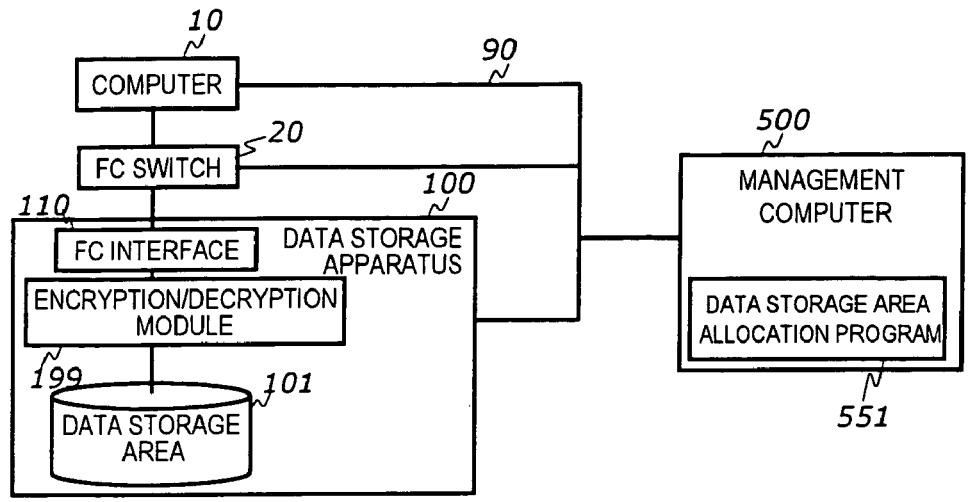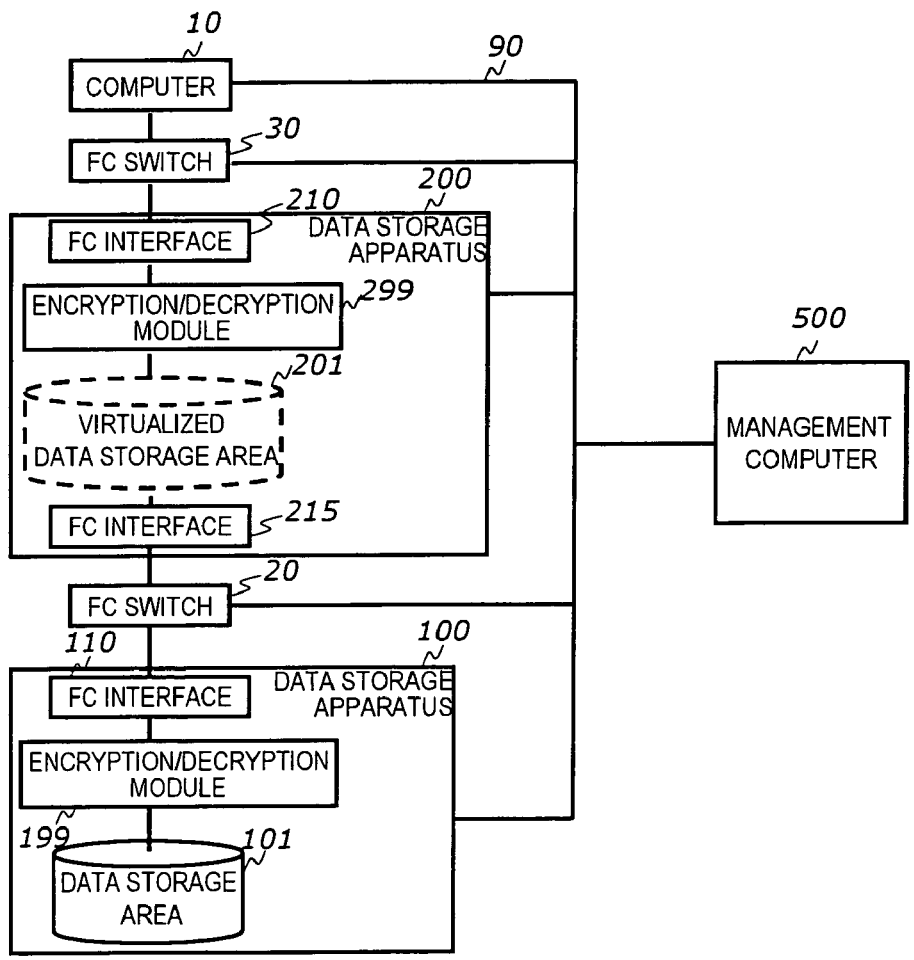

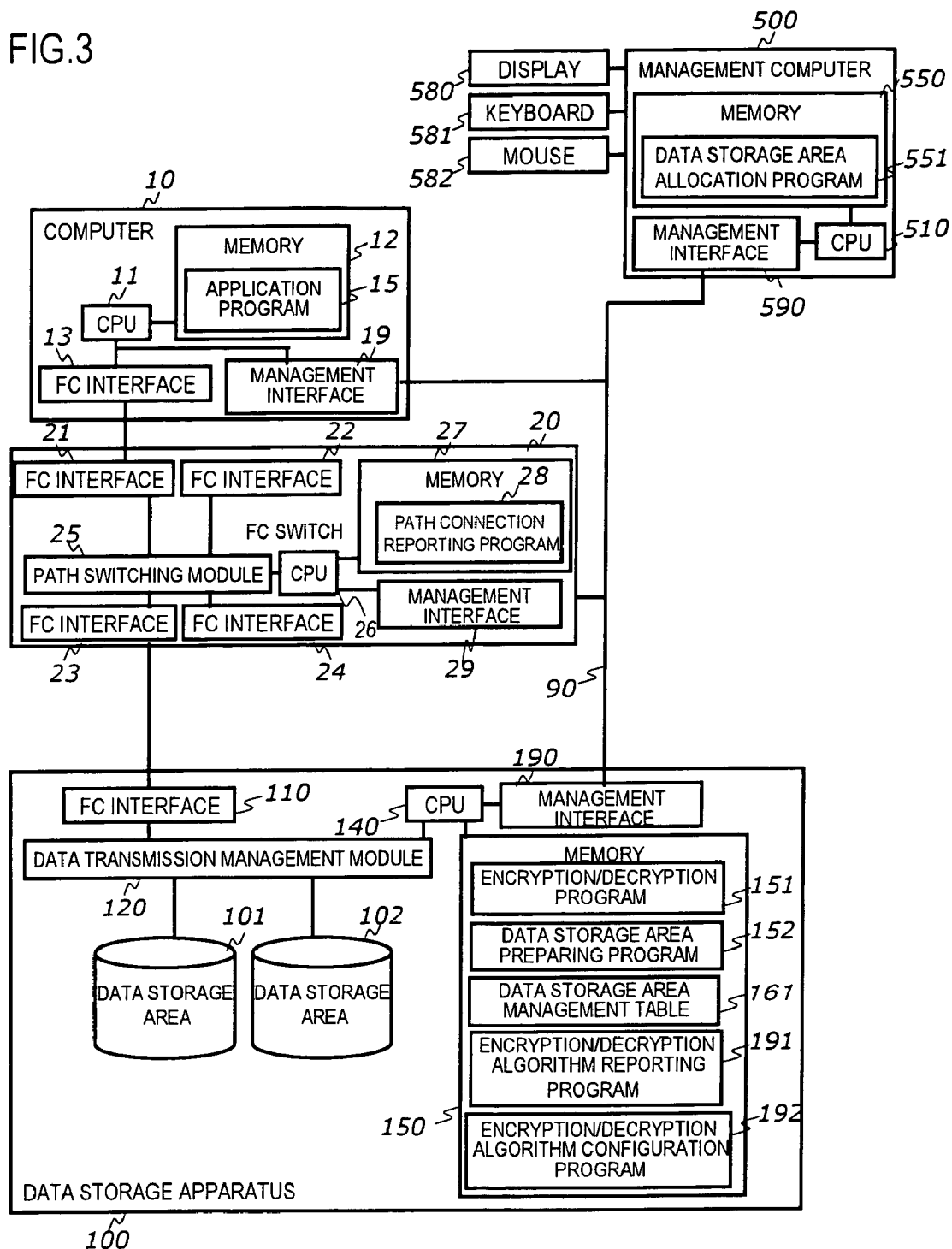

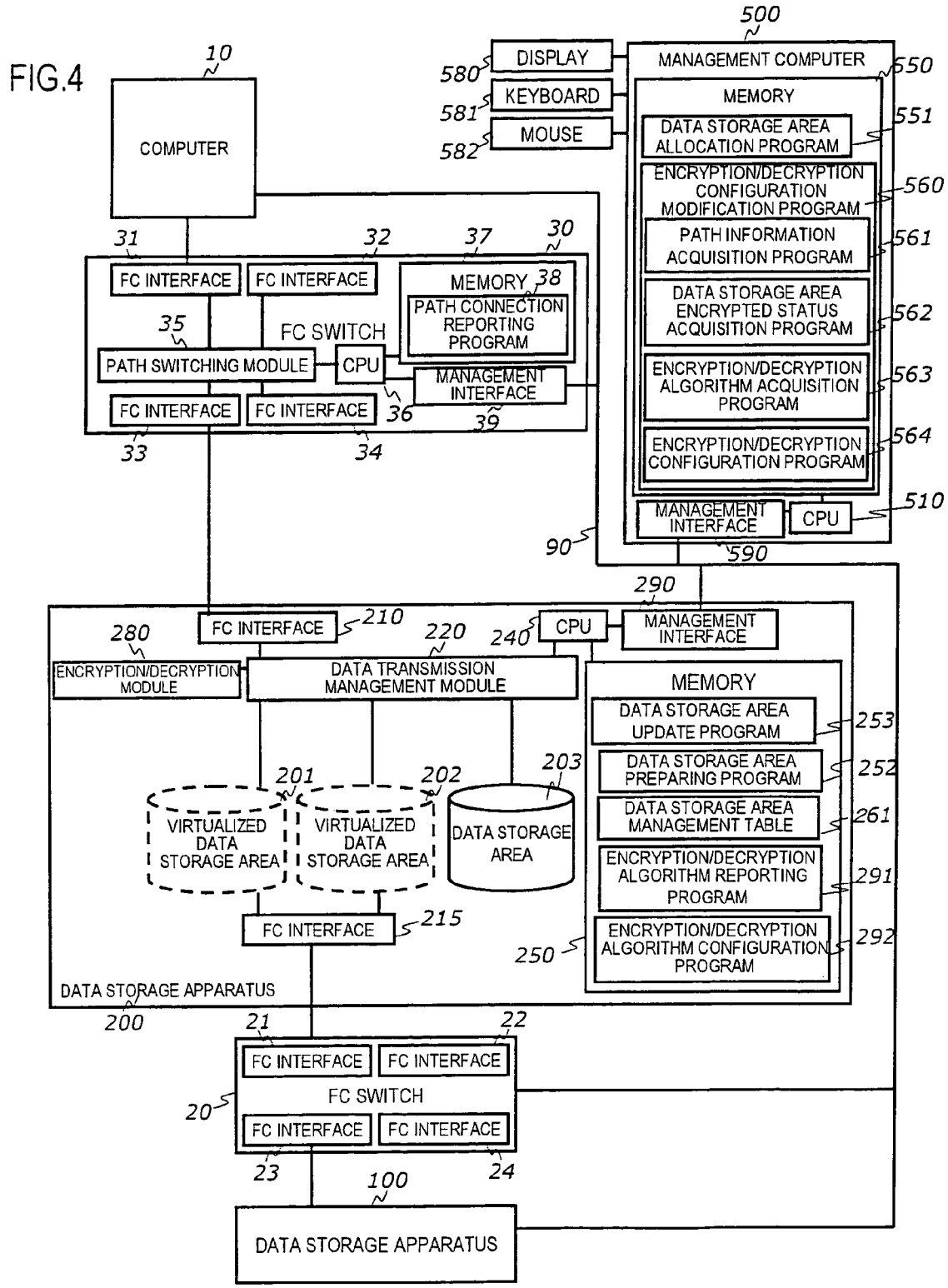

DATA STORAGE AREA ALLOCATION REQUEST

FIG.5A

| COMPUTER WWN | CAPACITY | ENCRYPTION/DECRYPTION ALGORITHM | KEY |
|---|---|---|---|
| 13 | 100MB | AA | 1234 |

FIG.5B

| COMPUTER WWN | CAPACITY | ENCRYPTION/DECRYPTION ALGORITHM | KEY |
|---|---|---|---|
| 13 | 200MB | AB | 987654 |

DATA STORAGE AREA MANAGEMENT TABLE

FIG.6A

| DATA STORAGE AREA NUMBER | COMPUTER WWN | CAPACITY | ENCRYPTION ALGORITHM | DECRYPTION ALGORITHM | KEY |
|---|---|---|---|---|---|
| 101 | 13 | 100MB | AA | AA | 1234 |
| 102 | 13 | 200MB | AB | AB | 987654 |

FIG.6B

| DATA STORAGE AREA NUMBER | COMPUTER WWN | CAPACITY | ENCRYPTION ALGORITHM | DECRYPTION ALGORITHM | KEY |
|---|---|---|---|---|---|
| 101 | 215 | 100MB | AA | AA | 1234 |
| 102 | 215 | 200MB | AB | AB | 987654 |

FIG.6C

| DATA STORAGE AREA NUMBER | COMPUTER WWN | CAPACITY | ENCRYPTION ALGORITHM | DECRYPTION ALGORITHM | KEY |
|---|---|---|---|---|---|
| 101 | 215 | 100MB | AA | AA | 1234 |
| 102 | 215 | 200MB | | | |

FIG.6D

| DATA STORAGE AREA NUMBER | COMPUTER WWN | CAPACITY | ENCRYPTION ALGORITHM | DECRYPTION ALGORITHM | KEY |
|---|---|---|---|---|---|
| 101 | 215 | 100MB | | AA | 1234 |
| 102 | 215 | 200MB | | | |

FIG.6E

| DATA STORAGE AREA NUMBER | COMPUTER WWN | CAPACITY | ENCRYPTION ALGORITHM | DECRYPTION ALGORITHM | KEY |
|---|---|---|---|---|---|
| 101 | 215 | 100MB | | | |
| 102 | 215 | 200MB | | | |

DATA STORAGE AREA MANAGEMENT TABLE

FIG.7A
261

| DATA STORAGE AREA NUMBER | COMPUTER WWN | CAPACITY | ENCRYPTION ALGORITHM | DECRYPTION ALGORITHM | KEY | INTERNAL/EXTERNAL FLAG | EXTERNAL DATA STORAGE APPARATUS NUMBER | EXTERNAL DATA STORAGE AREA NUMBER |
|---|---|---|---|---|---|---|---|---|
| 201 | 13 | 100MB | | | | EXTERNAL | 100 | 101 |
| 202 | 13 | 200MB | | | | EXTERNAL | 100 | 102 |

FIG.7B
261

| DATA STORAGE AREA NUMBER | COMPUTER WWN | CAPACITY | ENCRYPTION ALGORITHM | DECRYPTION ALGORITHM | KEY | INTERNAL/EXTERNAL FLAG | EXTERNAL DATA STORAGE APPARATUS NUMBER | EXTERNAL DATA STORAGE AREA NUMBER |
|---|---|---|---|---|---|---|---|---|
| 201 | 13 | 100MB | | | | EXTERNAL | 100 | 101 |
| 202 | 13 | 200MB | AB | AB | 987654 | EXTERNAL | 100 | 102 |

FIG.7C
261

| DATA STORAGE AREA NUMBER | COMPUTER WWN | CAPACITY | ENCRYPTION ALGORITHM | DECRYPTION ALGORITHM | KEY | INTERNAL/EXTERNAL FLAG | EXTERNAL DATA STORAGE APPARATUS NUMBER | EXTERNAL DATA STORAGE AREA NUMBER |
|---|---|---|---|---|---|---|---|---|
| 201 | 13 | 100MB | CC | CC | 12345678 | EXTERNAL | 100 | 101 |
| 202 | 13 | 200MB | AB | AB | 987654 | EXTERNAL | 100 | 102 |

FIG.7D
261

| DATA STORAGE AREA NUMBER | COMPUTER WWN | CAPACITY | ENCRYPTION ALGORITHM | DECRYPTION ALGORITHM | KEY | INTERNAL/EXTERNAL FLAG | EXTERNAL DATA STORAGE APPARATUS NUMBER | EXTERNAL DATA STORAGE AREA NUMBER |
|---|---|---|---|---|---|---|---|---|
| 201 | 13 | 100MB | | | | | 100 | 101 |
| 202 | 13 | 200MB | AB | AB | 987654 | EXTERNAL | 100 | 102 |
| 203 | 13 | 100MB | CC | CC | 12345678 | INTERNAL | | |

FIG.7E
261

| DATA STORAGE AREA NUMBER | COMPUTER WWN | CAPACITY | ENCRYPTION ALGORITHM | DECRYPTION ALGORITHM | KEY | INTERNAL/EXTERNAL FLAG | EXTERNAL DATA STORAGE APPARATUS NUMBER | EXTERNAL DATA STORAGE AREA NUMBER |
|---|---|---|---|---|---|---|---|---|
| 202 | 13 | 200MB | AB | AB | 987654 | EXTERNAL | 100 | 102 |
| 203 | 13 | 100MB | CC | CC | 12345678 | INTERNAL | | |

FIG.8

PATH INFORMATION

571

| HIERARCHY | 1 | | 2 | | ... | n | |
|---|---|---|---|---|---|---|---|
| COMPUTER WWN | DATA STORAGE APPARATUS NUMBER | DATA STORAGE AREA NUMBER | DATA STORAGE APPARATUS NUMBER | DATA STORAGE AREA NUMBER | | DATA STORAGE APPARATUS NUMBER | DATA STORAGE AREA NUMBER |
| 13 | 200 | 201 | 100 | 101 | ... | | |
| 13 | 200 | 202 | 100 | 102 | ... | | |

FIG.9

ENCRYPTION STATUS TABLE

572

| COMPUTER WWN | DATA STORAGE APPARATUS NUMBER | DATA STORAGE AREA NUMBER | ENCRYPTION ALGORITHM | KEY |
|---|---|---|---|---|
| 13 | 100 | 101 | AA | 1234 |
| 13 | 100 | 102 | AB | 987654 |

SUPPORTED ENCRYPTION/DECRYPTION ALGORITHM INFORMATION

FIG.10 A

| DATA STORAGE APPARATUS NUMBER | SUPPORTED ENCRYPTION ALGORITHM |
|---|---|
| 100 | AA |
| | AB |

| DATA STORAGE APPARATUS NUMBER | SUPPORTED ENCRYPTION ALGORITHM |
|---|---|
| 200 | AB |
| | CC |

574 ical-list-item">## ENCRYPTION/DECRYPTION MANAGEMENT METHOD IN COMPUTER SYSTEM HAVING STORAGE HIERARCHY The present application is based on and claims priority of Japanese patent application No. 2004-272772 filed on Sep. 21, 2004, the entire contents of which are hereby incorporated by reference.

BACKGROUND

The present invention relates to an encryption/decryption management method for an encrypted data storage area in a computer system having a data storage apparatus. In particular, the present invention relates to an encryption/decryption management method for an encrypted data storage area in a computer system having plural data storage apparatuses arranged hierarchically and plural kinds of encryption/decryption means existing on a path between a computer and the data storage area.

To improve the confidentiality of data saved by a computer in a data storage apparatus, it is contemplated to encrypt the data to be saved. If data is saved in an encrypted state, the confidentiality can be improved. However, data saved for a long time has to be always correctly decrypted when referring to the data. That is, correct data cannot be referred to if the same encryption/decryption algorithm or key as that used in encryption or an encryption/decryption algorithm or key that has an interoperability with that used in encryption is not used. As an encryption technique, there has been provided a technique that assigns different encryption keys to different zones so that one encryption key can permit only reference to the data in one zone (see Patent Document 1, for example).

On the other hand, an arrangement is becoming popular in which a data storage apparatus and a computer that used the data storage apparatus are connected to each other via a storage-dedicated network (this is referred to as Storage Area Network, SAN). In the network thus arranged, when the computer requires a data storage area, a data storage area in the data storage apparatus is appropriately allocated to the computer, and a management computer determines a path between the computer and the data storage area to enable the computer to adequately use the data storage area (see Patent Document 2, for example).

Patent Document 1: Japanese Patent Laid-Open No. 2002-351747

Patent Document 2: Japanese Patent Laid-Open No. 2001-142648

Patent Document 2 discloses a technique for preparing a new data storage area and determining a path to enable the computer to use the data storage area. In addition, as described in Patent Document 1, it is well known that correct data cannot be obtained if the algorithm or key used in encryption is not the same as that used in decryption.

However, Patent Document 2 does not disclose any technique for determining a path to enable the computer to adequately use an encrypted data storage area when the computer system that has the encrypted data storage area in the data storage apparatus is modified to have plural encryption/decryption means.

SUMMARY

The present invention has been devised in view of such circumstances, and one feature of the present invention is to provide a method for modifying, in a computer system including a data storage apparatus (storage system) having a data storage area (volume) storing encrypted data, a path between a computer and the data storage area storing the encrypted data that enables the computer to appropriately access the data storage area storing the encrypted data even if the modified path includes plural encryption/decryption means, and to provide a method for updating a data storage area storing encrypted data.

Furthermore, another feature of the present invention is to provide a method for modifying a path between a computer and a data storage area by adding a second data storage apparatus between the computer and the encrypted data storage area, and a method for updating a data storage area storing encrypted data.

To be more specific about at least one of the features of the present invention, a computer system having plural encryption/decryption modules on a path between a computer and a data storage area is arranged in such a manner that, if there is an interoperability among the encryption/decryption modules and the data storage area is encrypted by a first encryption/decryption module, the computer accesses the data storage area using a second encryption/decryption module (or an n-th encryption/decryption module closer to the computer than the second encryption/decryption module), rather than the first encryption/decryption module that is closer to the data storage area. If a data storage apparatus has the first encryption/decryption module, the data storage apparatus is configured to be capable of making a choice of whether to use the first encryption/decryption module, and thus, a path including the encryption/decryption module or including no encryption/decryption module can be determined. In addition, a management computer may be provided to determine the path or configure the encryption/decryption function.

With such an arrangement, even if a computer system in which a data storage area is previously encrypted by a first encryption/decryption module is modified, and a path between the data storage area and a computer includes plural encryption/decryption modules, it is possible to determine such a path that encryption/decryption is performed using an encryption/decryption module closer to the computer.

The other features of the invention will be more apparent from the description of the present specification and appended drawings.

BRIEF DESCRIPTION OF THE DRAWINGS

FIG. 2 is a diagram for illustrating a modification of a data storage apparatus in the computer system;

FIG. 3 is a diagram illustrating a computer system (before structure modification) to which the encryption/decryption management method is applied;

FIG. 4 is a diagram illustrating the computer system (after structure modification) to which the encryption/decryption management method is applied;

FIG. 5 shows an example of a data storage area allocation request;

FIG. 6 shows an example of a data storage area management table 161 in a data storage apparatus 100;

FIG. 7 shows an example of a data storage area management table 261 in a data storage apparatus 200;

FIG. 8 shows an example of path information;

FIG. 9 shows an example of an encryption status table;

FIG. 10 shows an example of supported encryption/decryption algorithm information;

DETAILED DESCRIPTION OF THE PREFERRED EMBODIMENTS

Figure 1:
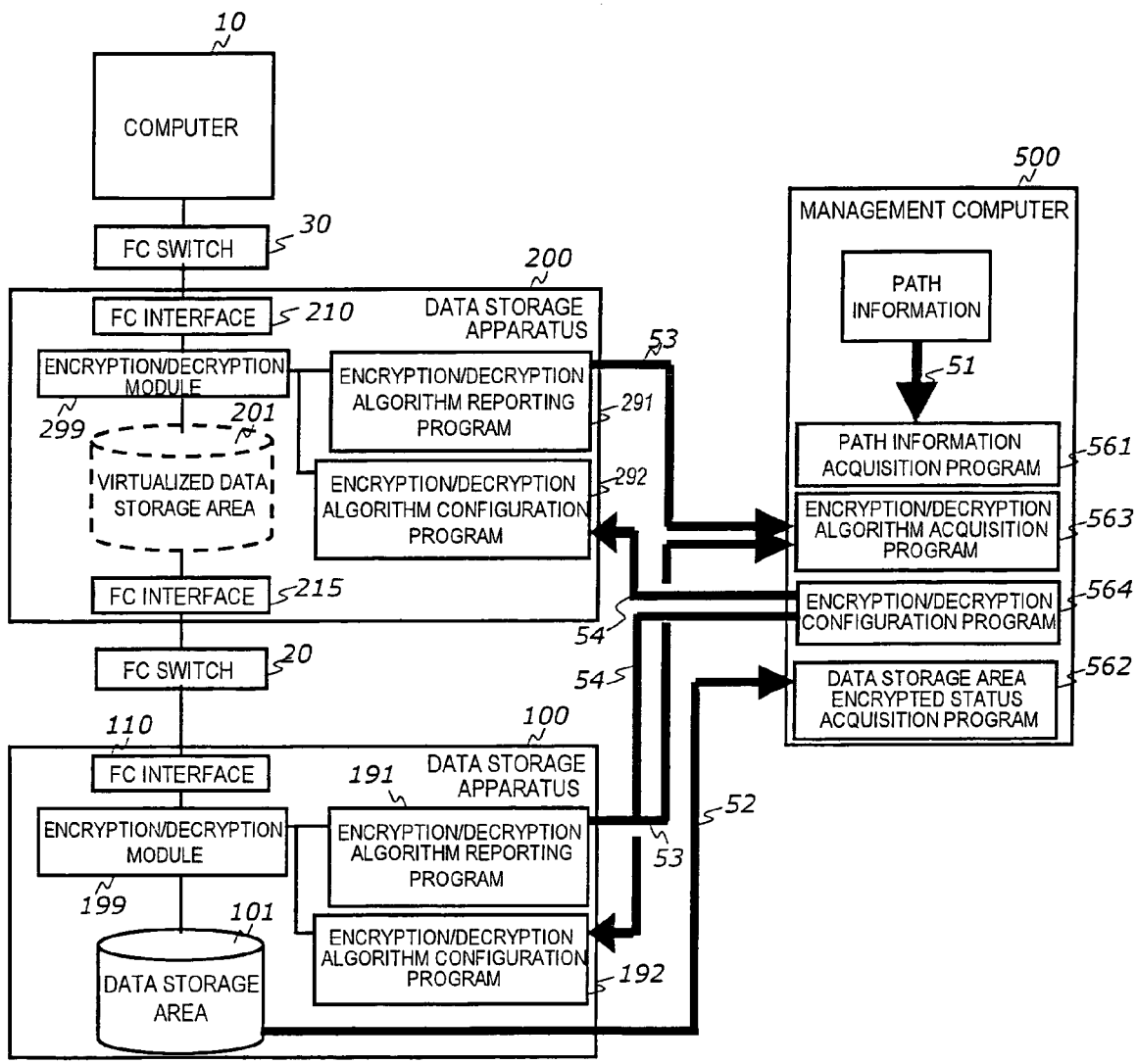
FIG. 1 is a diagram for illustrating an exemplary basic operation of a computer system to which an encryption/decryption management method is applied.

In the following, embodiments of the present invention will be described with reference to the drawings. According to the present invention, in a computer system comprising a computer and a plurality of data storage apparatus includes a first data storage apparatus and a second data storage apparatus closer to the computer which are connected hierarchically to each other, the first data storage apparatus has a first encryption/decryption module, the second data storage apparatus has a second encryption/decryption module, there is an interoperability between the first and second encryption/decryption modules (for example, the first and second encryption/decryption modules encrypt data to be stored in a data storage area or decrypt encrypted data from a data storage area using the same encryption/decryption algorithm and the same key), and if a data storage area is encrypted by the first encryption/decryption module, the computer accesses the data storage area using the second encryption/decryption module rather than the first encryption/decryption module. Since it is possible to make a choice of whether to use the encryption/decryption module of a data storage apparatus, it is possible to make a choice of whether to include the encryption/decryption algorithm in a path. In addition, a management computer may be provided to determine the path or configure the encryption/decryption algorithm. In addition, the first encryption/decryption module in the first data storage apparatus may be configured from the second data storage apparatus.

Furthermore, according to the present invention, in a computer system comprising a computer and a data storage apparatus which is composed of a first data storage apparatus and a second data storage apparatus closer to the computer which are connected hierarchically to each other, the first data storage apparatus has a first encryption/decryption module, the second data storage apparatus has a second encryption/decryption module, there is no interoperability between the first and second encryption/decryption modules, and if a data storage area is encrypted by the first encryption/decryption module, the data storage area storing the data encrypted by the first encryption/decryption module is selected from the first data storage apparatus, the data in the selected data storage area is read by decrypting the data using the first encryption/decryption module, the read data is encrypted by the second encryption/decryption module, and the data encrypted by the second encryption/decryption module is written to the data storage area without using the first encryption/decryption module. Alternatively, the data storage area storing the data encrypted by the first encryption/decryption module may be selected from the first data storage apparatus, a new data storage area may be prepared in the second data storage apparatus, the data in the selected data storage area may be read by decrypting the data using the first encryption/decryption module, the read data may be encrypted by the second encryption/decryption module, and the data encrypted by the second encryption/decryption module may be written to the data storage area prepared in the second data storage apparatus.

First Embodiment

Referring to FIGS. 1 and 2, an arrangement of a computer system to which an encryption/decryption management method according to a first embodiment of the present invention is applied will be schematically described. In a conventional computer system shown in FIG. 2A, a computer 10 is connected to a data storage apparatus 100 via a fibre channel switch (referred to as an FC switch, hereinafter) 20. In addition, a management computer 500 is provided and connected to the computer 10, the FC switch 20 and the data storage apparatus 100 via a management network 90. If a technique, such as one disclosed in Patent Document 2 described above, is applied to such a computer system, when the computer 10 requests allocation of a data storage area from the management computer 500, a data storage area allocation program 551 in the management computer 500 prepares a data storage area 101 in the data storage apparatus 100, selects a fibre channel interface 110 (referred to as an FC interface, hereinafter) capable of connecting to the computer from among FC interfaces of the data storage apparatus 100 and establishes the connection, thereby enabling the computer 10 to use the data storage area 101.

In the arrangement shown in FIG. 2A, the data storage apparatus 100 has an encryption/decryption module 199. The encryption/decryption module 199 encrypts data received at a write request from the computer 10, and the encrypted data is stored in the data storage area 101. Data read from the data storage area 101 at a read request from the computer 10 is decrypted by the encryption/decryption module 199 and transmitted to the computer 10. The encryption and the decryption are performed using an encryption/decryption algorithm and a preset key of the encryption/decryption module (the key may be set by an administrator via the management computer 500 or set by the administrator directly in the data storage apparatus 100), and therefore, when the computer 10 uses the data storage area, data reading/writing can be performed without being particularly aware of the encryption/decryption module 199.

FIG. 2B shows a modified arrangement of the computer system shown in FIG. 2A which further has a data storage apparatus 200 and an FC switch 30 between the computer 10 and the FC switch 20. The data storage apparatus 200 can provide a data storage area of its own to the computer 10 or provide a data storage area of the data storage apparatus 100 to the computer as if the data storage area is a one of its own (shown by a dotted line as a virtualized data storage area 201 in the diagram). In the arrangement shown in FIG. 2B, by letting the data storage apparatus 200 use the data storage area 101 of the data storage apparatus 100 as a data storage area of its own, the computer 10 can use the data storage area 101 as if the computer 10 uses the virtualized data storage area 201 of the data storage apparatus 200. The data storage apparatus 200 further has an FC interface 210 for connecting to the computer 10 and an FC interface 215 for connecting to the data storage apparatus 100. In addition, the data storage apparatus 200 has an encryption/decryption module 299. The FC switches each can be connected to plural data storage apparatuses.

Upon receiving a request to read the virtualized data storage area 201 from the computer 10, the data storage apparatus 200 creates a request to read the data storage area 101 and issues the read request to the data storage apparatus 100. If the encryption/decryption module 199 of the data storage apparatus 100 is configured the same as the one shown in FIG. 2A, the read data is decrypted by the encryption/decryption module 199, and the decrypted data is sent to the data storage apparatus 200. The data storage apparatus 200 transmits the data read from the data storage area 101 to the computer 10 without using the encryption/decryption module 299 (that is, by bypassing the encryption/decryption module 299). As described above, if the data storage apparatus 100 sends data that is not encrypted (that is, decrypted data) to the data storage apparatus 200, of course, the encryption/decryption module 299 of the data storage apparatus 200 does not have to be used. Similarly, in the case where the computer 10 makes a request to write the virtualized data storage area 201, the encryption/decryption module 299 must not be used. This is because the data has to be encrypted by the data storage apparatus 100, since the virtualized data storage area (virtual volume) 201 is actually the data storage area (real volume) 101. Therefore, when the data storage apparatus 200 receives a request to write the virtualized data storage area 201 from the computer 10, the data storage apparatus 200 receives write data, creates a request to write the data storage area 101 and issues the write request to the data storage apparatus 100. Upon receiving the write request and the write data, the data storage apparatus 100 encrypts the received data using the encryption/decryption module 199 and stores the encrypted data in the data storage area 101.

With the arrangement described above, even if the computer system is modified by connecting the data storage apparatus 200 between the computer 10 and the data storage apparatus 100, data can be stored in the data storage area 101 in a conventional encrypted state. However, the data exchanged between the data storage apparatus 200 and the data storage apparatus 100 is not encrypted, and therefore, there is a possibility that the data is stolen if a device that accesses the data storage apparatus 100 in an illegal way is connected to the FC switch 20, for example. The arrangement shown in FIG. 2B is expected as a virtualization technology to make the arrangement of the data storage apparatuses 100 and 200 look like one large data storage apparatus 200 from the computer 10 although it is configured of data storage apparatus 100 and data storage apparatus 200. Therefore, in the virtualization technology that makes the data storage apparatus 200 look like one large data storage apparatus including the data storage apparatus 100, encryption of data exchanged between the data storage apparatus 100 and the data storage apparatus 200 is essential for increasing the data confidentiality.

Thus, the present invention provides a computer system configured as shown in FIG. 1. A management computer 500 has a path information acquisition program 561, a data storage area encrypted status acquisition program 562, an encryption/decryption algorithm acquisition program 563, and an encryption/decryption configuration program 564. In addition, the management computer 500 has path information, an encryption status table, and supported encryption/decryption algorithm information stored therein (not shown). If the computer system is modified, an administrator instructs the management computer 500 to execute the sequence described below. Of course, the management computer 500 may recognize the modification of the computer system and automatically execute the sequence.

[Path Information Acquisition Program 561]

This is a program for acquiring path information.

(1) The management computer 500 acquires path information about a data storage area used by the computer 10 by means of the path information acquisition program 561 (51).

The path information is created by associating information pieces obtained from the computer, the FC switch and the data storage apparatus with each other. In the case shown in FIG. 1, the computer 10 recognizes that the data storage area 101 of the data storage apparatus 100 is being used via the virtualized data storage area 201 of the data storage apparatus 200, the data storage apparatus 200 has the encryption/decryption module 299, and the data storage apparatus 100 has the encryption/decryption module 199. In FIG. 1, the management computer 500 is configured to retain the path information.

[Data Storage Area Encrypted Status Acquisition Program 562]

This is a program for acquiring data storage area encrypted status information.

(2) Then, the management computer 500 acquires encryption status (52) of an end data storage area seen from the computer (the data storage area 101 in the case shown in FIG. 1) by means of the data storage area encrypted status acquisition program 562. In the case shown in FIG. 1, the data storage area 101 retains data encrypted by the encryption/decryption module 199 using a preset key (that is, a key used for encryption and decryption), and the acquired data storage area encrypted status information is retained in the management computer 500 in the form of an encryption status table.

[Encryption/Decryption Algorithm Acquisition Program 563]

This is a program for acquiring information about the encryption/decryption algorithm supported by each data storage apparatus.

(3) Then, by means of the encryption/decryption algorithm program 563, the management computer 500 acquires information about the encryption/decryption algorithm supported by each encryption/decryption module from each data storage apparatus as an encryption/decryption algorithm report (53). In the case shown in FIG. 1, the management computer 500 inquires of the data storage apparatuses 100 and 200 about their respective encryption/decryption algorithms. The data storage apparatuses 100 and 200 have encryption/decryption algorithm reporting programs 191 and 291, respectively, for responding to the inquiries. In the case shown in FIG. 1, the acquired encryption/decryption algorithm information is retained in the management computer 500 as supported encryption/decryption algorithm information.

[Encryption/Decryption Configuration Program 564]

This is a configuration program for the encryption/decryption modules.

(4) Finally, based on the acquired information, the management computer 500 performs configurations of the two encryption/decryption modules 199 and 299 interposed between the computer 10 and the data storage area 101 using the encryption/decryption configuration program 564. If there is an interoperability between the encryption/decryption modules 199 and 299, that is, if the encryption/decryption modules 199 and 299 use the same encryption/decryption algorithm, the encryption/decryption module 199 is configured not to be used, and the encryption/decryption module 299 is configured to be used. If there is no interoperability between the encryption/decryption modules 199 and 299, that is, if the encryption/decryption modules 199 and 299 use different encryption/decryption algorithms, the encryption/decryption module 199 is configured to be used, and the encryption/decryption module 299 is configured not to be used. The data storage apparatuses 100 and 200 have encryption/decryption algorithm configuration programs 192 and 292 for responding to the configuration requests, respectively.

Due to the procedure described above, the data storage apparatus 100 and the data storage apparatus 200 can be hierarchically connected to each other, and if there is an interoperability between the encryption/decryption modules 199 and 299, data can be exchanged between the data storage apparatuses 100 and 200 with the data encrypted. Therefore, in the virtualization technology that makes the data storage apparatus 200 look like a large data storage apparatus including the data storage apparatus 100, the data confidentiality can be enhanced.

As described above, the computer system according to the present invention comprises the computer 10, the first data storage apparatus 100, the second data storage apparatus 200, and the management computer 500, the second data storage apparatus 200 being hierarchically connected to the computer 10 via the FC switch 30 and to the first data storage apparatus 100 via the FC switch 20, in which the management computer 500 has: (1) a path information acquisition section that acquires information about the path of the data storage area used by the computer 10; (2) a data storage area encrypted status acquisition section that acquires information about the encryption/decryption used by the data storage area 101 of the end data storage apparatus 100 (that is, the data storage area encrypted status information); (3) an encryption/decryption algorithm acquisition section that acquires information about the encryption/decryption algorithm supported by the encryption/decryption module of each data storage apparatus (that is, the supported encryption/decryption algorithm information); and (4) an encryption/decryption configuration section that determines whether to use the encryption/decryption module of each data storage apparatus or not based on the acquired path information, the data storage area encrypted status information, and the supported encryption/decryption algorithm information, and the first data storage apparatus 100 and the second data storage apparatus 200 each have an encryption/decryption module (that is, an encryption/decryption section); (1) an information reporting section that reports the path information, the data storage area encrypted status information, and the encryption/decryption algorithm information in response to the path information acquisition request, the data storage area encrypted status information acquisition request, and the supported encryption/decryption algorithm acquisition request from the management computer 500; and (2) an encryption/decryption algorithm configuration section that determines the use of the encryption/decryption module based on an encryption/decryption configuration instruction from the management computer 500.

[System Arrangement]

Referring to FIG. 3 and subsequent drawings, characteristics of the computer system according to the present invention will be described in detail. FIG. 3 shows an arrangement of the computer system yet to be modified, and FIG. 4 shows a modified arrangement thereof. First, in FIG. 3, the computer 10 is connected to the data storage apparatus 100 via the FC switch 20. In addition, the computer system has the management computer 500. The computer 10, the FC switch 20, and the data storage apparatus 100 are connected to the management computer 500 via a management network 90. The management network 90 used here is an IP network. Implementation of the present invention is not restricted by the fibre channel or the protocol, such as IP.

[Computer 10]

The computer 10 has a CPU 11 for executing a program, a memory 12 for storing a program executed by the CPU and data, and an FC interface 13 for connecting to the data storage apparatus via an FC switch. The memory 12 stores an application program 15, which is executed by the CPU 11. The application program 15 performs data processing by reading/writing data from/to the data storage apparatus. Furthermore, the computer 10 has a management interface 19 and is connected to the management computer 500 via the management network 90.

[FC Switch 20]

According to this embodiment, the FC switch 20 has four FC interfaces 21 to 24 for connecting to the computer and the data storage apparatus, a path switching module 25, a CPU 26, a memory 27, and a management interface 29. The path switching module 25 determines to which FC interface a packet received at a particular one of the FC interfaces is to be issued (the packet is a data string in a particular format that represents data or a request issued by the computer or data storage apparatus). The path switching module 25 is controlled by the CPU 26.

The memory 27 stores a path switching program for controlling the path switching module 25 (not shown) and a path connection reporting program 28 for reporting the current path connection to the management computer. In addition, the FC switch 20 has the management interface 29 and is connected to the management computer 500 via the management network 90.

The FC switch 20 is connected to the computer 10 via the FC interface 21 and to the data storage apparatus 100 via the FC interface 23. The FC switch identifies each FC interface by a unique identifier named World Wide Name (WWN) and grasps the path connection among the FC interfaces thereby. In this specification, description will be made assuming that the reference numerals in the drawing correspond to the WWNs. In addition, description will be made assuming that a zoning function of the FC switch (that is, the function of permitting packet exchange only between particular FC interfaces) is not used in this embodiment.

[Data Storage Apparatus 100]

The data storage apparatus 100 comprises an FC interface 110, data storage areas 101 and 102, a data transmission management module 120 that manages data transmission between the data storage area and the FC interface, a CPU 140 that manages processing of a request from the computer and the data storage area, and a memory 150 that stores a program used by the CPU and a table required for executing the program. The memory 150 stores a read/write request processing program for processing a read/write request from the computer (not shown), an encryption/decryption program 151 for encrypting/decrypting data, and a data storage area preparing program 152 for preparing a data storage area in response to a request from the management computer. In addition, the data storage apparatus 100 has a management interface 190 and is connected to the management computer 500 via the management network 90.

[Encryption/Decryption Program 151 in Data Storage Apparatus 100]

The encryption/decryption program 151 stored in the data storage apparatus 100 performs encryption and decryption of data in response to an instruction from the CPU 140. There are various data encryption algorithms for data encryption. However, the present invention is not restricted in any way by the encryption algorithm, and therefore, the encryption/decryption algorithm used is not specified herein. The description in this specification will be made on the assumption that the encryption/decryption program 151 supports an AA-type algorithm and an AB-type algorithm. In addition, it is assumed that the AA type requires a 128-bit key for encryption/decryption, and the AB type requires a 256-bit key for encryption/decryption. Of course, data encrypted according to the AA type can be decrypted only according to the AA type, and data encrypted according to the AB type can be decrypted only according to the AB type. In addition, both the encryption/decryption algorithms cannot adequately achieve decryption if the keys are incorrect. In the data storage apparatus 100, the encryption algorithm, the decryption algorithm and the key therefor for each data storage area are stored in the memory 150 in the form of a data storage area management table 161 shown in FIG. 6.

In addition, the data storage apparatus 100 stores an encryption/decryption algorithm reporting program 191 for reporting the type of the algorithm supported by the encryption/decryption program 151 in the data storage apparatus 200, and an encryption/decryption algorithm configuration program 192 for choosing whether to use or not the encryption/decryption program for each data storage area in response to an instruction form the management computer 500. The management computer 500 is notified by the encryption/decryption algorithm reporting program 191 that the AA type encryption algorithm and the AB type encryption algorithm are supported.

[Management Computer 500]

The management computer 500 comprises a CPU 150 for executing a program, a memory 550 for storing a program to be executed by the CPU and data, and a management interface 590 for connecting to the management network 90. The memory 550 stores a data storage area allocation program 551, which is executed by the CPU 510. In addition, the memory 550 stores an encryption/decryption configuration modification program 560, path information (not shown), an encryption status table, and supported encryption/decryption algorithm information. In addition, the management computer 500 has a display 580 for showing required information to the administrator and a keyboard 581 and a mouse 582 for allowing input by the administrator.

[Allocation of Data Storage Area]

In the description concerning this embodiment, it is assumed that the state where the data storage apparatus 100 has no data storage area allocated by the computer 10 is the initial state. The application program 15 in the computer 10 issues a request for data storage area allocation to the management computer 500 via the management network 90. The data storage area allocation request issued from the computer 10 to the management computer 500 includes at least information about the required capacity, the WWN for identifying the computer (the WWN of the FC interface of the computer 10 is "13"), and the encryption/decryption algorithm and the key of the relevant encryption.

Upon receiving the data storage area allocation request, the data storage area allocation program 551 in the management computer 500 requests the data storage apparatus 100 to allocate a data storage area via the management network 90.

Upon receiving the data storage area allocation request from the management computer 500, the data storage area preparing program 152 in the data storage apparatus 100 prepares a data storage area based on the capacity information included in the request and connects the data storage area to the data transmission management module 120. Furthermore, based on the WWN information included in the request, the data transmission management module 120 may be configured so as to process only the read/write request from a particular computer (as techniques for performing such configuration, the LUN security technique and the LUN masking technique are commonly known). Furthermore, based on the encryption/decryption algorithm and the key included in the request, the encryption/decryption program 151 is configured to be used. Finally, the completion of data storage area allocation is reported to the management computer 500.

Upon receiving the report of the completion of data storage area allocation in the data storage apparatus 100, the management computer 500 then checks the FC switch. Specifically, the management computer 500 checks the FC switch by inquiring of the path connection reporting program 28 whether the FC switch is configured so as to exchange packets between the FC interface 23 connected to the FC interface 110 of the data storage apparatus 100 and the FC interface 21 connected to the FC interface 13 of the computer 10. Since the zoning function is not used herein, the description will be made assuming that there is no particular restriction. Once the check of the FC switch is completed, the management computer 500 reports the computer 10 that the data storage area meeting the request is prepared. The application program 15 can perform the processing thereof using the data storage area allocated by the management computer 500.

In this embodiment, it is assumed that the application program 15 issues two data storage area allocation requests shown in FIGS. 5A and 5B to the management computer 500. Thus, as shown in FIG. 3, two data storage areas 101 and 102 are prepared in the data storage apparatus 100, and the data storage apparatus 100 retains the data storage area management table 161 shown in FIG. 6A. When the computer 10 issues a read/write request, the read/write request processing program and the encryption/decryption program 151 in the data storage apparatus 100 perform a read/write processing by referring to the data storage area management table 161. Once the data storage areas are allocated to the computer by the procedure described above, the data written by the computer 10 is encrypted according to the encryption algorithm and the key included in the data storage area allocation request and stored in either of the data storage areas.

[Modification of Computer System]

Now, the computer system shown in FIG. 3 is modified into the arrangement having data storage apparatuses hierarchically connected to each other shown in FIG. 4. The computer system shown in FIG. 4 is the computer system shown in FIG. 3 additionally having a data storage apparatus 200 and an FC switch 30 between the computer 10 and the FC switch 20 in which the data storage apparatuses are hierarchically connected to each other.

[FC Switch 30]

The FC switch 30 is configured basically the same as the FC switch 20. The FC switch 30 has four FC interfaces 31 to 34 for connecting to the computer and the data storage apparatus. In this embodiment, reference numerals of 30s are used to discriminate among the FC interfaces. However, the modules and functions other than the FC interfaces denoted by reference numerals of 30s are essentially the same as those denoted by reference numerals of 20s. The FC switch 30 is connected to the computer 10 via the FC interface 31 and to the data storage apparatus 200 via the FC interface 33. This embodiment will be described on the assumption that the zoning function of the FC switch is not used.

[Data Storage Apparatus 200]

The data storage apparatus 200 is configured basically the same as the data storage apparatus 100. However, the data storage apparatus 200 further has an FC interface 215 for connecting another data storage apparatus. Furthermore, in the data storage apparatus 100, the encryption/decryption program 151 is stored in the memory 150, and the CPU 140 performs encryption and decryption. On the other hand, in the data storage apparatus 200, encryption and decryption are performed by a dedicated LSI. Therefore, an encryption/decryption module 280 is connected to a data transmission management module 220 and performs encryption and decryption according to an instruction from the CPU 240. In general, such a dedicated LSI can perform encryption and decryption at a higher rate than software.

[Encryption/Decryption Module 280 in Data Storage Apparatus 200]

The encryption/decryption module 280 in the data storage apparatus 200 encrypts or decrypts data in response to an instruction from the CPU 240. The description will be made on the assumption that the encryption/decryption module 280 supports the AB-type encryption/decryption, which is also supported by the encryption/decryption program 151 in the data storage apparatus 100, and a CC-type encryption/decryption algorithm, which is supported only by the encryption/decryption module 280. The CC type requires a 512-bit key. Of course, the data encrypted according to the CC type can be decrypted only according to the CC type, and the decryption cannot be adequately achieved if the key is incorrect. As with the data storage apparatus 100, in the data storage apparatus 200, the encryption/decryption algorithm and the key therefor for each data storage area are stored in a memory 250 in the form of a data storage area management table 261.

In addition, the data storage apparatus 200 stores an encryption/decryption algorithm reporting program 291 for reporting the type of the encryption/decryption algorithm supported by the encryption/decryption module 280 of the data storage apparatus 200. The management computer 500 is notified by the encryption/decryption algorithm reporting program 291 that the CC-type encryption algorithm and the AB-type encryption algorithm are supported.

[Configuration Modification of Data Storage Apparatus 100]

When modifying the computer system shown in FIG. 3 into the arrangement shown in FIG. 4, the configuration of the data storage apparatus 100 has to be previously modified. In the data storage apparatus 100 arranged as shown in FIG. 3, two data storage areas 101 and 102 are prepared, and the data storage area management table 161 shown in FIG. 6A is prepared in the memory 150. According to the data storage area management table 161 shown in FIG. 6A, only the computer assigned with the WWN "13" can read/write the data storage areas 101 and 102. Therefore, in the arrangement shown in FIG. 4, the data storage apparatus 200 cannot access these data storage areas via the FC interface 215. Thus, the computer WWN "13" in the data storage area management table 161 shown in FIG. 6A is modified to "215" as shown in FIG. 6B. A data storage area management table updating program (not shown) may be provided in the data storage apparatus 100 so that this modification is performed according to an instruction from the management computer 500.

[Configuration of Data Storage Apparatus 200]

As with the data storage apparatus 100, the data storage apparatus 200 has a data storage area management table. A data storage area management table 261 in the data storage apparatus 200 is shown in FIG. 7. The data storage area management table 261 differs from the data storage area management table 161 in that the data storage area management table 261 additionally contains an internal/external flag, an external data storage apparatus number, and an external data storage area number. If the data storage apparatus 200 is configured as shown in FIG. 7A, the CPU 240 in the data storage apparatus 200 processes a request to read/write virtualized data storage areas 201 and 202 by reading/writing the data storage areas 101 and 102 in the data storage apparatus 100 connected thereto via the FC interface 215, respectively. A data storage area management table updating program (not shown) may be provided in the data storage apparatus 200 so that the modification is performed according to an instruction from the management computer 500.

[Modification of Encryption Configuration]

Since the configurations of the data storage apparatuses 100 and 200 are modified as described above with the modification of the computer system, the computer 10 can access the data storage apparatuses 101 and 102 as is conventional. Of course, in the arrangement shown in FIG. 4, the computer 10 accesses the virtualized data storage areas 201 and 202, while the virtualized data storage areas 201 and 202 are actually the data storage areas 101 and 102, respectively, as is conventional. With the configurations described above, the data exchanged between the data storage apparatus 100 and the data storage apparatus 200 (that is, between the FC interface 110 and the FC interface 215) is not encrypted.

Figure 13:
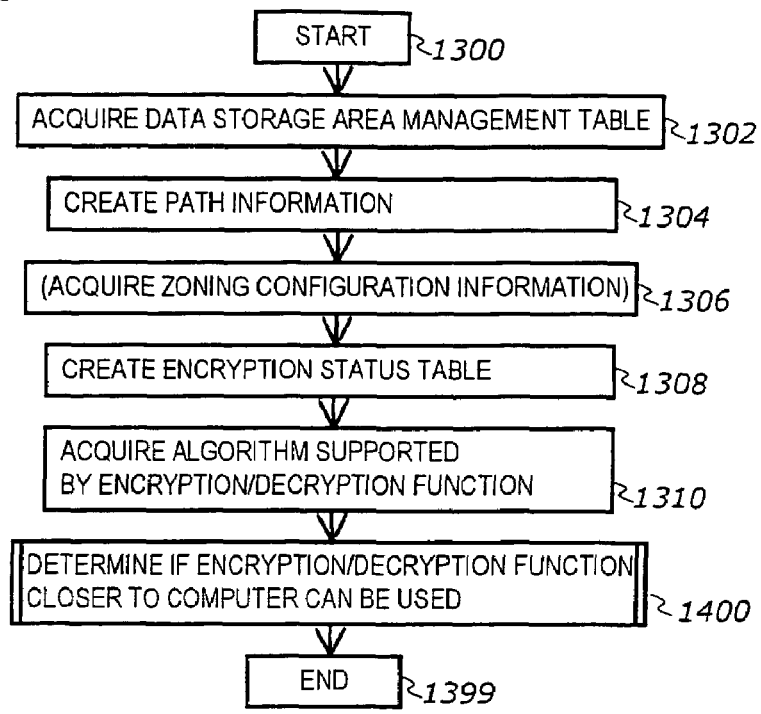
FIG. 13 is a flowchart showing an example of a method of updating an encryption configuration.

Thus, the administrator executes the encryption/decryption configuration modification program 560 in the management computer 500. The encryption/decryption configuration modification program 560 comprises the path information acquisition program 561, the data storage area encrypted status acquisition program 562, the encryption/decryption algorithm acquisition program 563, and the encryption/decryption configuration program 564. In the following, an operation of the encryption/decryption configuration program 560 will be described with reference to FIGS. 13 and 14.

[Encryption/Decryption Configuration]

Upon receiving an instruction to execute the encryption/decryption configuration modification program 560 from the administrator, the management computer 500 first acquires the data storage area management table 161 and the data storage area management table 261 from the data storage apparatus 100 and the data storage apparatus 200, respectively (step 1302).

The path information acquisition program 561 creates path information based on the acquired data storage area management tables 161 and 261 (step 1304). FIG. 8 shows path information 571. From the path information 571 shown in FIG. 8, the management computer 500 can know that the computer 10 uses two data storage areas, one of which is the virtualized data storage area 201 in the first layer thereof (the second data storage apparatus 200) and is the data storage area 101 in the second layer thereof (the first data storage apparatus 100), and the other of which is the virtualized data storage area 202 in the first layer thereof and is the data storage area 101 in the second layer thereof. In this embodiment, since it is assumed that the FC switches 20 and 30 do not use the zoning function, the path can be acquired without acquisition of connection information from the FC switches. However, in the case where the zoning function is used, the management computer 500 has to acquire configuration information about the zoning function from each FC switch (step 1306).

Then, the data storage area encrypted status acquisition program 562 creates an encryption status table from the acquired data storage area management tables 161 and 262 (step 1308). FIG. 9 shows an encryption status table 572. Then, the management computer 500 knows that the two data storage areas connected to the computer 10 are the data storage area 101 and the data storage area 102 at the ends thereof, whose encryption/decryption algorithms are the AA-type and the AB-type, respectively, and whose encryption/decryption keys are "1234" and "987654", respectively.

Then, the encryption/decryption algorithm acquisition program 563 inquires of the data storage apparatuses 100 and 200 about the encryption/decryption algorithms supported by their respective encryption/decryption functions (step 1310).

Upon receiving the inquiries, the encryption/decryption algorithm reporting programs 191 and 291 in the data storage apparatuses report the supported encryption/decryption algorithm information shown in FIG. 10 respectively. FIG. 10A shows supported encryption/decryption algorithm information 573 reported from the encryption/decryption algorithm reporting program 191 in the data storage apparatus 100. FIG. 10B shows supported encryption/decryption algorithm information 574 reported from the encryption/decryption algorithm reporting program 291 in the data storage apparatus 200.

Finally, from the path information 571 and the encryption status table 572 created in the preceding steps and the supported encryption/decryption algorithm information 573 and the supported encryption/decryption algorithm information 574 acquired from the data storage apparatuses, the encryption/decryption configuration program 564 determines whether the encryption/decryption function of the data storage apparatus located closer to the computer can be used for encryption/decryption of the end data storage areas (step 1400).

That is, from the path information 571, the encryption/decryption configuration program 564 confirms that the data storage apparatus 200 is located in the layer immediately above the data storage area 101, which is the end data storage area seen from the computer 10 (step 1402). In addition, from the encryption status table 572, the encryption/decryption configuration program 564 can know the encryption/decryption algorithm of the data storage area 101 is the AA type (step 1404). Thus, the encryption/decryption configuration program 564 confirms whether or not the data storage apparatus 200 in the upper layer supports the AA-type encryption/decryption function by referring to the supported encryption/decryption algorithm information 574 (step 1406). As shown in FIG. 10B, the data storage apparatus 200 does not support the AA type. Therefore, as for the data storage area 101, the encryption/decryption function of the data storage apparatus 100 has to be continuously used, so that the configuration modification is not required. Then, the process ends (step 1499).

Then, from the path information 571, the encryption/decryption configuration program 564 can confirm that the data storage apparatus 200 is located in the layer immediately above the data storage area 102, which is the end data storage area seen from the computer 10 (step 1402). In addition, from the encryption status table 572, the encryption/decryption configuration program 564 can know the encryption/decryption algorithm of the data storage area 102 is the AB type (step 1404). Thus, the encryption/decryption configuration program 564 confirms whether or not the data storage apparatus 200 in the upper layer supports the AB-type encryption/decryption function by referring to the supported encryption/decryption algorithm information 574 (step 1406). As shown in FIG. 10B, the data storage apparatus 200 supports the AB type. Therefore, the encryption/decryption configuration program 564 determines that the encryption/decryption function of the data storage apparatus 200 can be used for the data storage area 102, and data exchange between the data storage apparatus 200 and the data storage apparatus 100 can be performed with the data being encrypted.

Thus, the encryption/decryption configuration program 564 modifies the data storage area management table 161 in the data storage apparatus 100 as shown in FIG. 6C and modifies the data storage area management table 261 in the data storage apparatus 200 as shown in FIG. 7B (step 1408). Here, the null encryption algorithm fields in the data storage area management tables 161 and 261 mean that encryption is not performed at a write request, and the null decryption algorithm fields mean that data decryption is not performed at a read request.

As described above, by modifying the configuration of the encryption/decryption function, the encryption/decryption configuration program 564 can modify the system configuration so that, as for the data storage area 102, the data exchange between the data storage apparatus 200 and the data storage apparatus 100 can be performed with the data being encrypted. In addition, since the encryption/decryption module 280 constituted by an LSI can be used instead of the encryption/decryption program 151 implemented by software, the time required for encryption and decryption can be generally reduced, and a speed-up of the process is expected.

[Supplemental Remark about Timing of Execution]

In the description of this embodiment, the encryption/decryption configuration modification program 560 is executed in response to an instruction from the administrator. However, the encryption/decryption configuration modification program 560 may be executed automatically when the management computer 500 monitoring the data storage area management table detects a modification of the data storage area management table.

Second Embodiment

A second embodiment of the present invention will be described concerning a method of updating the encryption algorithm for the data storage area 101, for which the encryption/decryption program 151 in the data storage apparatus 150 has to be continuously used in the first embodiment because the encryption/decryption algorithm is the AA type.

[System Arrangement]

The arrangement of the computer system according to this embodiment is basically the same as that shown in FIG. 4. However, according to this embodiment, the data storage apparatus 200 further stores a data storage area update program 253. The administrator can use a newer algorithm in an upper data storage apparatus in the hierarchy by instructing execution of the data storage area update program 253 from the management computer 500. In the following, two modes of processing of the data storage area update program 253 will be described with reference to flowcharts.

[First Mode of Processing (Rewrite)]

Figure 11:
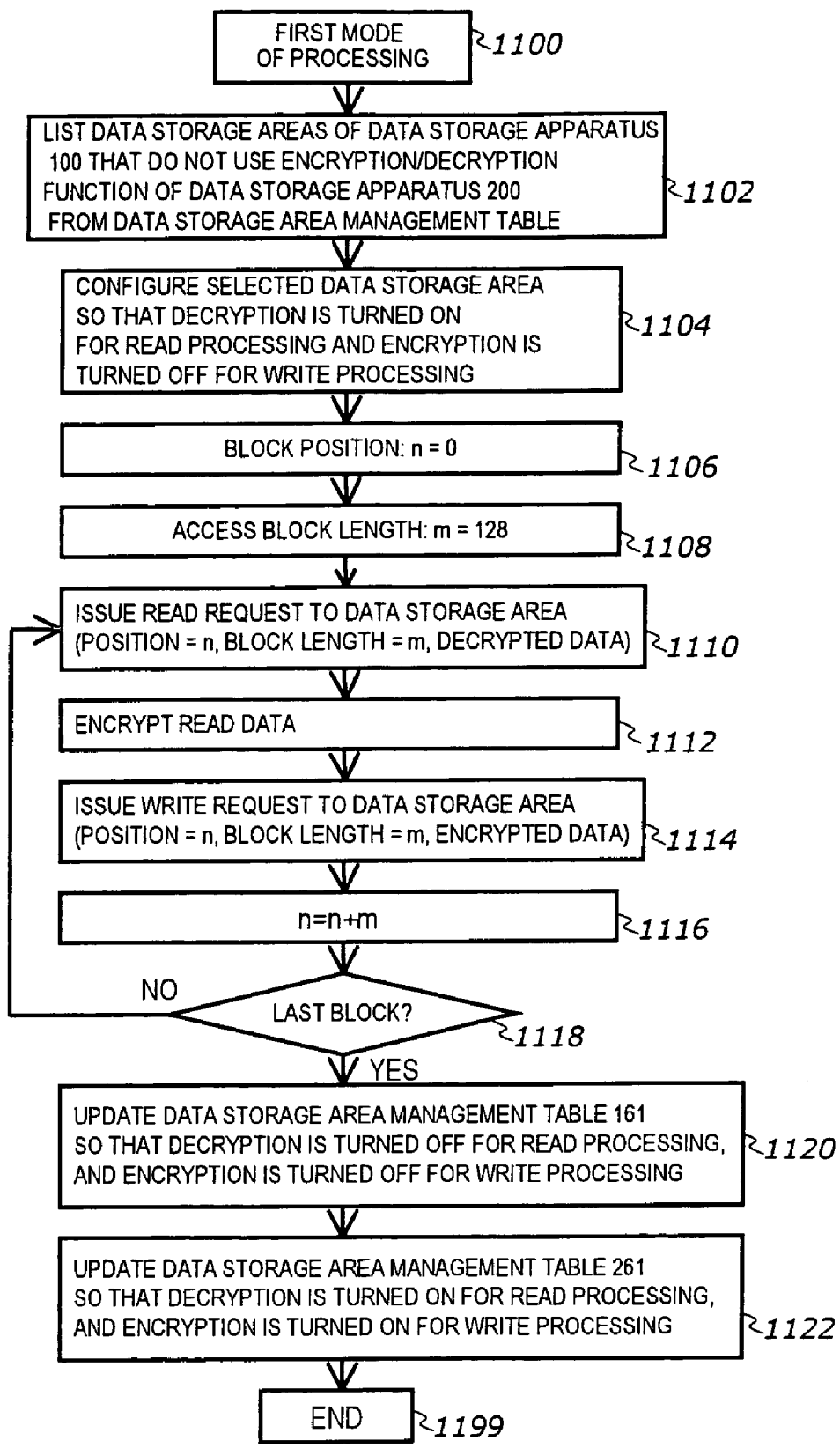
FIG. 11 is a flowchart showing an example of a method of updating an encryption/decryption algorithm (first mode of processing)

A first mode of processing (1100) will be described with reference to FIG. 11. In response to an instruction from the management computer 500, the data storage area update program 253 in the data storage apparatus 200 is activated. The instruction includes at least an encryption/decryption algorithm and a key. The description will be made on the assumption that the encryption algorithm is a CC type, and the key is "12345678".

First, the data storage area update program 253 refers to the data storage area management table 261 and lists the data storage areas that do not use the encryption/decryption function of the data storage apparatus 200 (step 1102). If the data storage area management table 261 is as shown in FIG. 7B, the data storage area update program 253 recognizes that the data storage area 201 does not use the encryption/decryption function of the data storage apparatus 200, from the fact that the encryption algorithm field in the storage area management table 261 is null. Since the virtualized data storage area 201 is actually the data storage area 101, the data storage area update program 253 instructs the encryption/decryption algorithm configuration program 192 in the data storage apparatus 100 to perform decryption at a request to read the data storage area 101 and not to perform encryption at a request to write the data storage area 101 (step 1104). The data storage area management table 161 is modified as shown in FIG. 6D. That is, the decryption algorithm is the AA type, and encryption is not performed.

Then, the data storage area update program 253 reads the blocks constituting the data storage area, from the first block to the last block, decrypts the blocks in the encryption/decryption module 280 in the data storage apparatus 200 and then writes back the decrypted blocks to the data storage area. Then, the data storage area update program 253 initializes the block position for starting the process to 0 (n=0) (step 1106). Then, the size of the block read at one read request (that is, the access block length) is initialized (m=128) (step 1108). A request to read the data storage area 101 is issued, and data is read from the data storage area 101 (step 1110). Since the data reading has been determined to be performed with the data being decrypted, the decrypted data is read. The data storage area update program 253 encrypts the read data in the encryption/decryption module 280 in the data storage apparatus 200 (step 1112). The encryption algorithm used here is the CC type, and the key is "12345678". The data storage area update program 253 issues a request to write the data storage area 101 and writes back the encrypted data to their respective original block positions (step 1114). Since this writing has been determined to be performed without data encrypted, the data encrypted by the encryption/decryption module 280 is retained in the data storage area 101. The data storage area update program 253 advances the block position to be processed (n=n+m) (step 1116). The data storage area update program 253 determines whether the next block position to be processed is the last block or not (step 1118), and if the next block is not the last one, the process returns to step 1110, and the procedure described above is repeated.

If it is determined that the next block is the last one in step 1118, the data storage area update program 253 modifies the data storage area management table 161 in the data storage apparatus 100 as shown in FIG. 6E (step 1120), and modifies the data storage area management table 261 in the data storage apparatus 200 as shown in FIG. 7C (step 1122).

By the process described above, the data storage area 101 is encrypted according to the CC-type algorithm provided by the encryption/decryption module 280 in the data storage apparatus 200, and the system configuration can be modified so that the data exchange between the data storage apparatus 100 and the data storage apparatus 200 is performed with the data being encrypted. In general, a newer encryption/decryption algorithm is less likely to be broken and, thus, has a higher confidentiality. For example, if the data storage apparatus 200 modified to have an encryption/decryption module capable of executing the CC-type encryption/decryption algorithm, which has a higher encryption level than the AA type, encrypts data in the data storage apparatus 101, the data can be encrypted/decrypted according to the algorithm that cannot be provided by the data storage apparatus that actually stores the data.

[Second Mode of Processing (Migration to Upper Data Storage Apparatus)]

Figure 12:
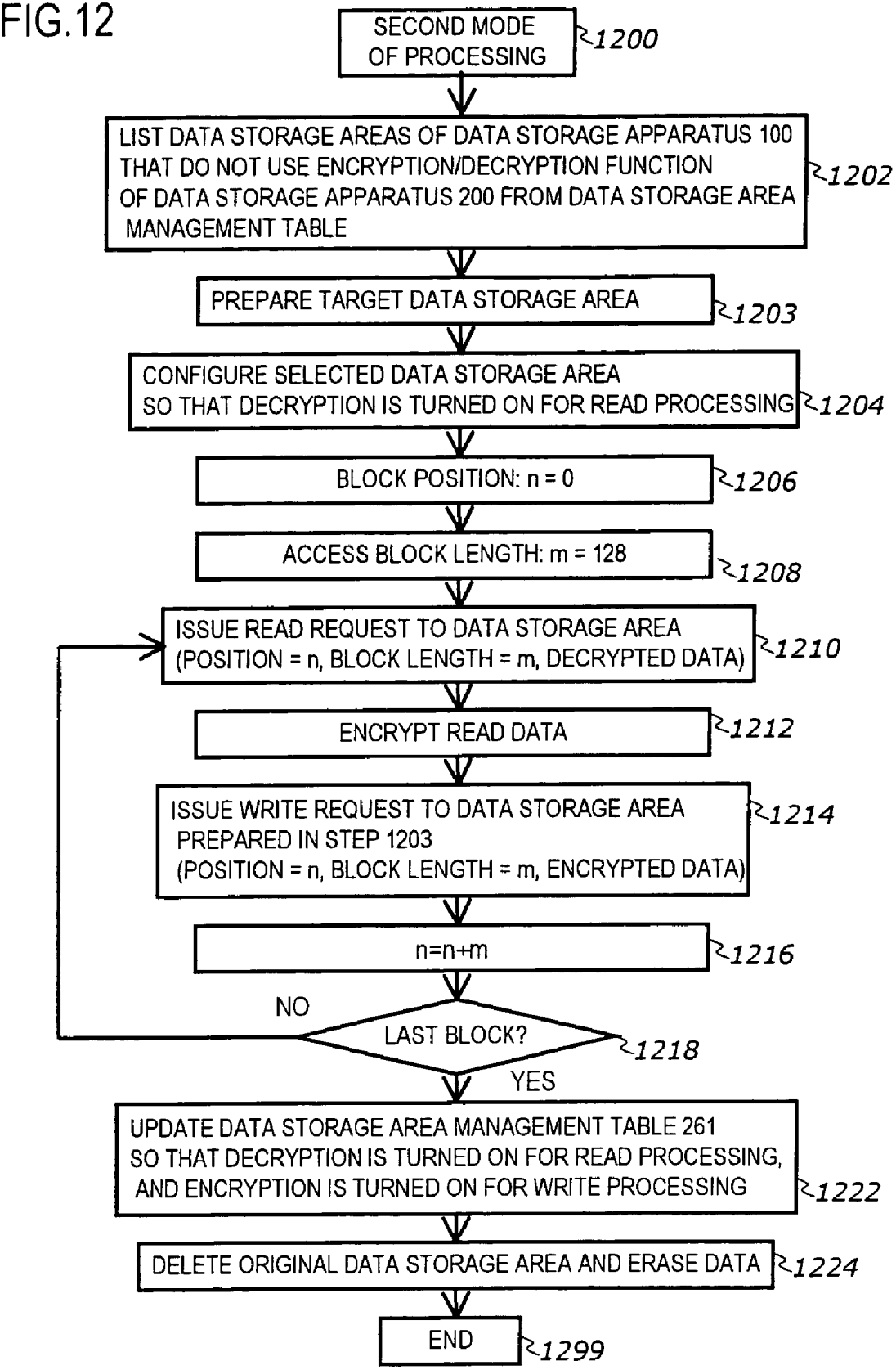
FIG. 12 is a flowchart showing an example of a method of updating an encryption/decryption algorithm (second mode of processing)

With reference to FIG. 12, a second mode of processing (1200) will be described. The second mode of processing differs from the first mode of processing in that, in the second mode of processing, the data is migrated into a newly allocated data storage area in the data storage apparatus 200, and the storage area 101 in the data storage apparatus 100 is restored to an unallocated state after the data migration is completed, while the data encrypted by the encryption/decryption module 280 in the data storage apparatus 200 is written back to the original data storage area 101 in the first mode of processing. The description will be made on the assumption that the state shown in FIG. 7B is the initial state.

In response to an instruction from the management computer 500, the data storage area update program 253 in the data storage apparatus 200 is activated. The instruction includes at least an encryption/decryption algorithm and a key. The description will be made on the assumption that the encryption/decryption algorithm is the CC type, and the key is "12345678".

First, the data storage area update program 253 refers to the data storage area management table 261 and lists the data storage areas that do not use the encryption/decryption function of the data storage apparatus 200 (step 1202). Here, it is assumed that the data storage area 101 is the target of update, as with the first mode of processing. Then, a data storage area preparing program 252 in the data storage apparatus 200 is executed to prepare a data storage area having a size equal to or larger than the update-target data storage area in the data storage apparatus 200 (step 1203). Here, it is assumed that a data storage area 203 is prepared in the data storage apparatus 200. In this case, the data storage area management table 261 in the data storage apparatus 200 is updated as shown in FIG. 7D.

Then, the data storage area update program 253 configures the data storage apparatus 100 so that decryption is performed at a request to read the data storage area 101 (step 1204). In this mode of processing, the data storage area management table 161 may be in the state shown in FIG. 6C or 6D.

Then, as in the first mode of processing, the data storage area update program 253 reads the blocks constituting the data storage area, from the first block to the last block, decrypts the blocks in the encryption/decryption module 280 in the data storage apparatus 200, and then writes back the decrypted blocks to the original data storage area (steps 1206 to 1218). However, this mode of processing differs from the first mode in that, in step 1214, the blocks are written to the data storage area 203 prepared in step 1203.

Finally, the data storage area update program 253 modifies the data storage area management table 261 in the data storage apparatus 200 as shown in FIG. 7E (step 1222). In addition, the data storage area update program 253 instructs the data storage area preparing program 152 in the data storage apparatus 100 to deallocate the data storage area 101 (step 1224). When the data storage area 101 is deallocated, the data in the data storage area 101 in the data storage apparatus 100 is preferably completely erased.

By the process described above, as in the first mode of processing, the data storage area 101 can be encrypted according to the CC-type algorithm provided by the encryption/decryption module 280 in the data storage apparatus 200 and migrated to the data storage area 203 in the data storage apparatus 200. Thus, there is no longer a need to contemplate the confidentiality of the data exchange between data storage apparatuses.

In particular, if there is an interoperability among encryption/decryption means of plural data storage apparatuses in the computer system in which the plural data storage apparatuses are arranged hierarchically, encrypted data can be exchanged among the data storage apparatuses in the hierarchy, and thus, there can be provided an encryption/decryption management method for the computer system that makes illegal access difficult.

Even when the data storage apparatuses 100 and 200 support the same algorithm, the AB type, if the encryption/decryption module of the data storage apparatus 200 can execute another algorithm having a higher encryption level than the AB type, the CC type, for example, the CC type of the higher encryption level can be set by the rewrite or migration. The data in the data storage area encrypted according to the CC type is difficult to decrypt compared with the previous data storage apparatus (lower data storage apparatus), and the confidentiality can be enhanced.

Figure 14:
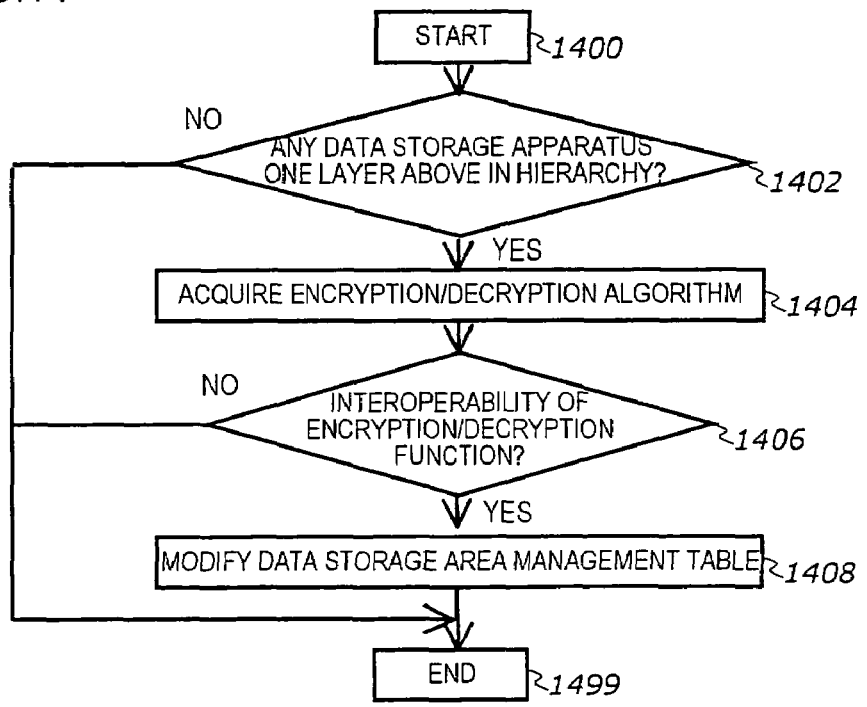
FIG. 14 is a flowchart showing an example of a method of updating an encryption configuration.

For example, even if it is determined in step 1406 in FIG. 14 that there is an interoperability of encryption/decryption algorithm, whether to use one of the encryption/decryption algorithms acquired in step 1404 that can be executed by the data storage apparatus 200 and has a higher encryption level is chosen according to the input from the administrator. If the encryption method is not to be changed, the process proceeds to step 1408. On the other hand, if the encryption method is to be changed, it is chosen whether to use the first mode of processing or the second mode of processing, and the data storage area management table is updated according to the choice to complete the encryption/decryption configuration.

What is claimed is:

1. An encryption/decryption management method of a computer system, the computer system having: one or more computers; a data storage system including a first data storage apparatus, and a second data storage apparatus provided in a path between said one or more computers and said first data storage apparatus; a management computer connected to the first data storage apparatus and the second data storage apparatus, a first encryption/decryption section provided with said first data storage apparatus, and a second encryption/decryption section provided with said second data storage apparatus, the first encryption/decryption section and the second encryption/decryption section having an encryption/decryption algorithm for both encrypting data to be stored in said data storage system and decrypting encrypted data from said data storage system, the encryption/decryption management method comprising:

said second data storage apparatus providing a data storage area of said first data storage apparatus as an area to be accessed by the computer as if the area of the first data storage apparatus is a data storage area of the second data storage apparatus, acquiring a first information which indicates a type of encryption algorithm used for encrypting data stored in data storage area which the first data storage apparatus has;

acquiring a second information which indicates an encryption algorithm supported by the second encryption/decryption section which the second data storage apparatus has;

determining, based on the first information and the second information, whether or not the second encryption/decryption section supports the encryption algorithm used for encrypting data stored in the data storage area which the first data storage apparatus has; and if it is determined that the second encryption/decryption section supports the encryption algorithm, setting the first encryption/decryption section not to encrypt write data and not to decrypt read data, and setting the second encryption/decryption section to encrypt write data and to decrypt read data.

2. The encryption/decryption management method according to claim 1, wherein the management computer comprises operations of: setting a path including the first and second encryption/decryption sections for said computer to access said data storage system; performing configuration of encryption/decryption of the data storage system; and performing configurations of the first encryption/decryption section and the second encryption/decryption section according to an encryption/decryption algorithm of the first encryption/decryption section and an encryption/decryption algorithm of the second encryption/decryption section.

3. The encryption/decryption management method according to claim 2, wherein the configurations of the first encryption/decryption section and the second encryption/decryption section include: selecting whether or not to use the encryption/decryption algorithm of the first encryption/decryption section; and configuring the second encryption/decryption section so that the second encryption/decryption has an interoperability with the first encryption/decryption section.

4. The encryption/decryption management method according to claim 1, comprising said first encryption/decryption section and said second encryption/decryption section performing encryption or decryption according to a same encryption/decryption algorithm.

5. A computer system, comprising:

one or more computers;

a first data storage apparatus that has at least one data storage area for any computer of said one or more computers to store data;

a second data storage apparatus that is provided between said computer and said first data storage apparatus, with said computer, said first data storage apparatus and said second data storage apparatus being connected to each other via a network, and a management computer connected to the first data storage apparatus and the second data storage apparatus, wherein:

said second data storage apparatus provides a data storage area of said first data storage apparatus as an area to be accessed by the computer as if the area of the first data storage apparatus is a data storage area of the second data storage apparatus, said first data storage apparatus has a first encryption/decryption section, and said second data storage apparatus has a second encryption/decryption section, and data stored in data storage area which the first data storage apparatus has is encrypted by the first encryption/decryption section, and wherein the management computer:

acquires a first information which indicates a type of encryption algorithm used for encrypting data stored in data storage area which the first data storage apparatus has;

acquires a second information which indicates encryption algorithm supported by a second encryption/decryption section which the second data storage apparatus has;

determines, based on the first information and the second information, whether or not the second encryption/decryption section supports the encryption algorithm used for encrypting data stored in the data storage area which the first data storage apparatus has; and if it is determined that the second encryption/decryption section supports the encryption algorithm, sets the first encryption/decryption section not to encrypt write data and not to decrypt read data, and sets the second encryption/decryption section to encrypt write data and to decrypt read data.

6. The computer system according to claim 5, wherein said management computer makes a choice of whether to use the encryption/decryption algorithm of the encryption/decryption section for said first encryption/decryption section of said first data storage apparatus and/or said second encryption/decryption section of said second data storage apparatus.

7. The computer system according to claim 5,
wherein the management computer for managing encryption/decryption configurations of the data storage areas at least sets a path including the second data storage apparatus and the encryption/decryption section for said computer to access said data storage area, performs configurations of encryption/decryption of the data storage area, and performs configurations of the first encryption/decryption section and the second encryption/decryption section according to an encryption/decryption algorithm of the first encryption/decryption section and an encryption/decryption algorithm of the second encryption/decryption section.

8. A management computer in a computer system that includes one or more computers, a first data storage apparatus that has at least one data storage area for said computer to store data and a first encryption/decryption section, a second data storage apparatus that has a second encryption/decryption section and is located between said computer and said first data storage apparatus, wherein said second data storage apparatus provides a data storage area of said first data storage apparatus as an area to be accessed by the computer as if the area of the first data storage apparatus is a data storage area of the second data storage apparatus, and
wherein the management computer:
acquires a first information which indicates a type of encryption algorithm used for encrypting data stored in data storage area which the first data storage apparatus has;
acquires a second information which indicates encryption algorithm supported by a second encryption/decryption section which the second data storage apparatus has;
determines, based on the first information and the second information, whether or not the second encryption/decryption section supports the encryption algorithm used for encrypting data stored in the data storage area which the first data storage apparatus has; and
if it is determined that the second encryption/decryption section supports the encryption algorithm,
sets the first encryption/decryption section not to encrypt write data and not to decrypt read data, and
sets the second encryption/decryption section to encrypt write data and to decrypt read data.

9. The management computer in a computer system according to claim 8, wherein the management computer performs management in such a manner that the data encrypted by said second encryption/decryption section is written to said data storage area without using the first encryption/decryption section.

10. The management computer in a computer system according to claim 8, wherein said management computer performs management in such a manner that a new data storage area is prepared in the second data storage apparatus, the data in said selected data storage area is read by decrypting the data using the first encryption/decryption section, the read data is encrypted by the second encryption/decryption section, and the data encrypted by the second encryption/decryption section is written to the data storage area prepared in the second data storage apparatus.

* * * * *